US012056201B2

(12) United States Patent
Moreau-Arnott

(10) Patent No.: US 12,056,201 B2
(45) Date of Patent: *Aug. 6, 2024

(54) SYSTEMS AND METHODS FOR AUTOMATIC AND ADAPTIVE BROWSER BOOKMARKS

(71) Applicant: Capital One Services, LLC, McLean, VA (US)

(72) Inventor: Elijah Taylor Moreau-Arnott, Guelph (CA)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,277

(22) Filed: Apr. 21, 2023

(65) Prior Publication Data

US 2023/0259569 A1    Aug. 17, 2023

Related U.S. Application Data

(63) Continuation of application No. 17/589,909, filed on Feb. 1, 2022, now Pat. No. 11,663,284, which is a
(Continued)

(51) Int. Cl.
*G06F 17/00* (2019.01)
*G06F 3/0483* (2013.01)
(Continued)

(52) U.S. Cl.
CPC ........ *G06F 16/9562* (2019.01); *G06F 3/0483* (2013.01); *G06F 16/2379* (2019.01);
(Continued)

(58) Field of Classification Search
CPC ............. G06F 16/9558; G06F 16/9562; G06F 16/9566; G06F 30/483; G06F 40/205;
(Continued)

(56) References Cited

U.S. PATENT DOCUMENTS 6,631,496 B1    10/2003   Li et al.
6,832,350 B1    12/2004   Bates et al.
(Continued)

FOREIGN PATENT DOCUMENTS

CN      105653555 A   *  6/2016
WO   WO-2014094570 A1  *  6/2014  ......... G06F 17/2235
WO   WO-2018038801 A1  *  3/2018  ....... G06F 17/30598

OTHER PUBLICATIONS

International Preliminary Report on Patentability in related PCT Application No. PCT/US2022/013353, mailed Aug. 17, 2023.
(Continued)

*Primary Examiner* — Laurie A Ries
(74) *Attorney, Agent, or Firm* — TROUTMAN PEPPER HAMILTON SANDERS LLP; Christopher J. Forstner; John A. Morrissett

(57) ABSTRACT

A dynamic browser bookmark system configured to present a user's bookmarks in a hierarchical manner based on webpage contextual data is disclosed. The system may aggregate browser bookmarks associated with a user device. The system may determine a first webpage being viewed on the user device. The system may dynamically filter the browser bookmarks to determine a first plurality of browser bookmarks associated with the first webpage. The system may generate and transmit a graphical user interface including a hierarchical view of the browser bookmarks. The system may determine a second webpage being viewed on the user device and dynamically filter the aggregated browser bookmarks to determine a second plurality of browser bookmarks relevant to the second webpage, which may include a browser bookmark of the first plurality of browser bookmarks, and generate a second graphical user interface including a hierarchical view of the second plurality of browser bookmarks.

20 Claims, 5 Drawing Sheets

Related U.S. Application Data continuation of application No. 17/170,119, filed on Feb. 8, 2021, now Pat. No. 11,269,969.

(51) Int. Cl.
  *G06F 16/23* (2019.01)
  *G06F 16/955* (2019.01)
  *G06F 40/205* (2020.01)
  *G06F 40/258* (2020.01)

(52) U.S. Cl.
  CPC ........ *G06F 16/9558* (2019.01); *G06F 40/205* (2020.01); *G06F 40/258* (2020.01)

(58) Field of Classification Search
  CPC ...... G06F 40/258; G06F 9/451; G06F 3/0483; G06F 16/2379
  See application file for complete search history.

(56) References Cited

U.S. PATENT DOCUMENTS

| | | | |
|---|---|---|---|
| 7,277,928 B2 | 10/2007 | Lennon | |
| 7,424,483 B2 | 9/2008 | Ukai et al. | |
| 8,046,323 B2* | 10/2011 | Ma | G06F 16/9562 715/241 |
| 8,117,205 B2 | 2/2012 | Rychener | |
| 8,136,034 B2 | 3/2012 | Stanton et al. | |
| 8,495,484 B2* | 7/2013 | Ahmed | G06F 16/9535 715/208 |
| 8,577,671 B1 | 11/2013 | Barve et al. | |
| 8,959,345 B2 | 2/2015 | Hwang | |
| 9,123,070 B2 | 9/2015 | Lin-Hendel | |
| 9,141,590 B1* | 9/2015 | Wheeler | G06F 40/12 |
| 10,178,192 B2* | 1/2019 | Arulesan | H04L 67/5681 |
| 10,417,296 B1 | 9/2019 | Matsuoka | |
| 2002/0109714 A1 | 8/2002 | Chwa | |
| 2003/0126560 A1 | 7/2003 | Kurapati et al. | |
| 2004/0075682 A1 | 4/2004 | Burleson | |
| 2006/0041830 A1* | 2/2006 | Bohn | G06Q 10/00 715/201 |
| 2006/0259867 A1 | 11/2006 | Watson et al. | |
| 2007/0208751 A1* | 9/2007 | Cowan | G06Q 30/02 |
| 2008/0177858 A1 | 7/2008 | Aarnio et al. | |
| 2009/0006442 A1 | 1/2009 | Anderson et al. | |
| 2009/0089245 A1* | 4/2009 | Chi | G06F 16/955 |
| 2009/0119572 A1 | 5/2009 | Koivunen | |
| 2009/0249179 A1 | 10/2009 | Shieh et al. | |
| 2010/0169364 A1 | 7/2010 | Hardt | |
| 2010/0169756 A1 | 7/2010 | Bonchi et al. | |
| 2012/0010995 A1 | 1/2012 | Skirpa et al. | |
| 2012/0030590 A1* | 2/2012 | Olliphant | G06F 16/9577 715/760 |
| 2012/0216102 A1 | 8/2012 | Malla | |
| 2012/0310933 A1 | 12/2012 | Caputo et al. | |
| 2013/0117263 A1 | 5/2013 | Ukose et al. | |
| 2013/0151610 A1 | 6/2013 | Schoen et al. | |
| 2013/0227401 A1 | 8/2013 | Kandekar et al. | |
| 2013/0311862 A1 | 11/2013 | Malla | |
| 2014/0032576 A1 | 1/2014 | Swineford et al. | |
| 2014/0047352 A1 | 2/2014 | Leppan et al. | |
| 2015/0254216 A1* | 9/2015 | DeLuca | G06F 40/134 715/206 |
| 2015/0262069 A1 | 9/2015 | Gabriel et al. | |
| 2015/0269129 A1 | 9/2015 | Pou | |
| 2016/0026720 A1 | 1/2016 | Lehrer et al. | |
| 2016/0132494 A1 | 5/2016 | Ghosh et al. | |
| 2016/0188742 A1 | 6/2016 | Ingvoldstad et al. | |
| 2016/0267060 A1 | 9/2016 | Skirpa et al. | |
| 2017/0078414 A1* | 3/2017 | Arulesan | H04L 67/5681 |
| 2017/0300591 A1 | 10/2017 | Quintero | |
| 2017/0324837 A1 | 11/2017 | Quintero | |
| 2017/0351778 A1 | 12/2017 | Sperling | |
| 2019/0238952 A1 | 8/2019 | Boskovich | |
| 2019/0340302 A1 | 11/2019 | Murdock et al. | |
| 2020/0097517 A1 | 3/2020 | Abenski et al. | |
| 2022/0043815 A1* | 2/2022 | Gutiérrez | G06F 7/32 |

OTHER PUBLICATIONS

International Search Report and Written Opinion in related PCT Application No. PCT/US2022/013353, mailed Feb. 17, 2022.

\* cited by examiner

SYSTEMS AND METHODS FOR AUTOMATIC AND ADAPTIVE BROWSER BOOKMARKS

CROSS REFERENCE TO RELATED APPLICATIONS

This application is a continuation of, and claims priority under 35 U.S.C. § 120 to, U.S. patent application Ser. No. 17/589,909, filed Feb. 1, 2022, which is a continuation of U.S. patent application Ser. No. 17/170,119, now U.S. Pat. No. 11,269,969, filed Feb. 8, 2021, the entire contents of each of which are fully incorporated herein by reference.

FIELD

The disclosed technology relates to systems and methods for automatically adding browser bookmarks and dynamically filtering and presenting relevant bookmarks in a hierarchical view based on webpage contextual information.

BACKGROUND

In the internet-era world, browsing the internet and saving relevant webpages has become vital to the success of business and research. Users of the internet spend an ever-increasing amount of time saving relevant webpages as browser bookmarks, and often have to retrace their browsing history to rediscover relevant pages that were not previously bookmarked. This retracing and browsing through previously stored relevant browser bookmarks leads to business inefficiencies and requires significant man-hours. Even when users have saved relevant bookmarks, often it is difficult for a user to locate the right bookmark at the right time, such as when viewing a webpage relevant to a particular webpage bookmark that was previously saved by the user.

Accordingly, there is a need for a more robust adaptive browser bookmarking system capable of automatically saving relevant bookmarks and presenting previously saved bookmarks upon detecting contextual information from a webpage being currently viewed by the user. In response to determining the contextual information, the adaptive browser bookmarking system may determine a portion of relevant pre-stored webpage bookmarks and present the relevant webpage bookmarks in a conveniently organized manner. When the stored bookmarks include a parent-page and child-page relationship, such related browser bookmarks may be presented in a collapsible hierarchical list to the user. Embodiments of the present disclosure are directed to this and other considerations.

SUMMARY

Disclosed herein are systems and methods for a dynamic browser bookmark system for hierarchical presentation of a user's bookmarks based on contextual data. Consistent with the disclosed embodiments, a system is provided for hierarchical presentation of a user's bookmarks based on contextual data. The system includes one or more processors and memory in communication with the one or more processors and storing instructions, that when executed by the one or more processors, cause the system to perform one or more steps of a method for determining contextual webpage information, filtering through existing bookmarks, and presenting relevant browser bookmarks in a hierarchical view based on the contextual information. The system may aggregate, from a user device, a plurality of browser bookmarks associated with a user of the user device. Each browser bookmark may include a hyperlink configured to provide access to a respective browser bookmark. The system may determine a first webpage being viewed by the user device and dynamically filter the aggregated bookmarks to determine a first plurality of browser bookmarks associated with the first webpage. The system may generate a first graphical user interface that includes a hierarchical view of the first plurality of browser bookmarks and transmit the graphical user interface to the user device. The system may also determine a second webpage being viewed by the user device through at least one hyperlink presented on the first webpage and dynamically filter the aggregated bookmarks to determine a second plurality of browser bookmarks. The second plurality of browser bookmarks include at least one browser bookmark from the first plurality of browser bookmarks. The system may generate a second graphical user interface including a hierarchical view of the second plurality of browser bookmarks, and transmit the second graphical user interface to the user device.

Consistent with the disclosed embodiments, a system is provided for hierarchical presentation of a user's bookmarks based on contextual data. The system includes one or more processors and memory in communication with the one or more processors and storing instructions, that when executed by the one or more processors, cause the system to perform one or more steps of a method for dynamically filtering and contextually presenting browser bookmarks. The system may receive, from a user device, a first user request to access a first webpage. The system may determine, at least one webpage identifier based on the first user request. The system may determine first webpage contextual data based on the first webpage identifier. The system may receive, from the user device, a second user request to access a second webpage, which may be accessed through at least one hyperlink associated with the first webpage. The system may determine at least one second webpage identifier and determine second webpage contextual data based on the second webpage identifier. The system may calculate a similarity index between the first webpage and the second webpage based on a comparison of the first webpage contextual data and the second webpage contextual data. When the similarity index exceeds a predetermined threshold, the system may dynamically link at least one browser bookmark of the first plurality of browser bookmarks to the second webpage. The system may receive a third user request to access the second webpage and dynamically filter the plurality of browser bookmarks to generate for display, on the user device, the bookmarks that are dynamically linked to the second webpage.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology, however, may be embodied in many different forms and should not be construed as limited to the implementations set forth herein. The components described hereinafter as making up various elements of the disclosed technology are intended to be illustrative and not restrictive. Many suitable components that could perform the same or similar functions as components described herein are intended to be embraced within the scope of the disclosed systems and methods. Such other components not described herein may include, but are not limited to, for example, components developed after development of the disclosed technology.

It is also to be understood that the mention of one or more method steps does not imply a particular order of operation or preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
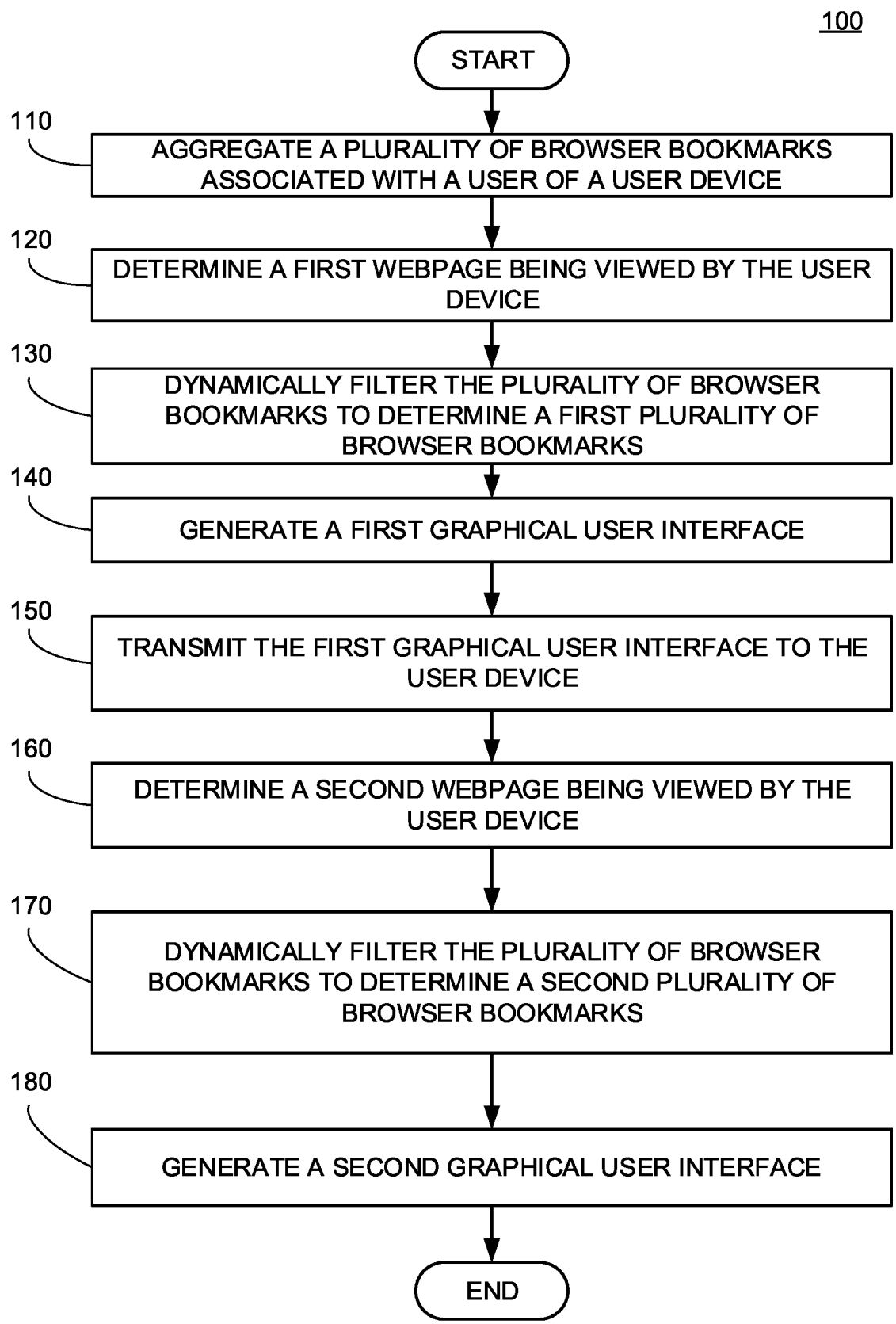
FIG. 1 is a flow chart of a method of hierarchical presentation of a user's bookmarks based on contextual data, in accordance with some examples of the present disclosure.

FIG. 1 is a flow chart of a method of dynamically filtering browser bookmarks for hierarchical presentation based on contextual data. Although steps in method 100 are described as being performed by the system (e.g., system 400 as described in more detail with respect to FIGS. 4-5) a person of ordinary skill in the art would understand that some or all of the steps of method 100 may be performed by one or more devices of the system (e.g., user computing device 420 and/or bookmark evaluation device 410, as described in more detail with respect to FIGS. 4-5). As shown in FIG. 1, in step 110 of method 100, the system (e.g., system 400) may aggregate a plurality of browser bookmarks associated with a user of a user device. For example, the user may have registered an account with a browser on the user device, which may monitor the user's browsing history, including what webpages are visited, how often these webpages are visited, when the respective webpages have been accessed, and which webpages have already been saved by the user as a browser bookmark.

In step 120, the system may determine a first webpage being viewed by the user device. For example, the bookmark evaluation device 410 may receive an indication from the user computing device 420 that the user has accessed a respective webpage (e.g., www.github.com). In some embodiments, the system may determine which webpage is being accessed by receiving a hyperlink accessed by the user computing device. In some embodiments, the bookmark evaluation device may parse the received hyperlink and determine a root webpage being accessed by the user. For example, when the user accesses "www.abcnews.com/latest_stories," the system may parse the hyperlink and determine the parent page as www.abcnews.com and that www.abcnews.com/latest_stories is a child page of www.abcnews.com. In some embodiments, link hierarchies may be determined by utilizing a directed graph. This method may be advantageous when determining hierarchies for pages that do not share a root webpage URL. For example, the bookmark evaluation device may monitor user browsing behavior in which a user begins browsing a first website. The user may subsequently visit a second website (e.g., by clicking a hyperlink found on the first website and/or manually entering a new hyperlink or URL to visit the second website). The bookmark evaluation device may determine that the first website is a root website and that the second website should be displayed in a hierarchy as a related "child" website. Continuing the example, a user starting on the first website may travel to a third website. The third website may additionally become a child website to the first website in the hierarchy determined by the bookmark evaluation device. Further, if a user visits a fourth website from the third website (e.g., by clicking on a hyperlink found on the third website and/or manually entering a URL or hyperlink) then the fourth website may be determined to be a "child" page to the third website. Accordingly, in a directed graph representation, a root node (e.g., the first website in the example) may be determined to be a parent page in the hierarchy, while a leaf node in the directed graph may be a child page of its respective root node. Additionally, in some embodiments, a node may be a root node with respect to some nodes, and a leaf node to others. In the previous example, the third webpage is a root node of the fourth webpage, but a leaf node with respect to the first webpage.

In step 130, the system may dynamically filter the plurality of browser bookmarks to determine a first plurality of browser bookmarks. The bookmark evaluation device may determine a hyperlink or uniform resource locator ("URL") that is associated with the webpage currently being viewed by the user on user computing device 410. In some embodiments, when the user is accessing a webpage that is a child page, the system may determine the associated parent page as described with respect to step 120. Once the parent page is determined, the system may request access from the user computing device and/or the user account associated with the user's browser to the user's existing browser bookmarks. The system may parse the user's existing browser bookmarks to determine existing browser bookmarks that are related to the webpage being accessed by the user. Related browser bookmarks may include webpages that have a same parent page as the webpage currently being viewed by the user, and may also include webpages that have content relevant to the webpage currently being viewed by the user. For example, when the user is accessing a webpage related to financial service provider A with which the user has an existing bank account, the system may determine that a browser bookmark associated with financial service provider B is a related browser bookmark because the user also carries a credit card financial account with financial service provider B and uses the bank account associated with financial service provider A to make payments on the credit card financial account associated with financial service provider B. According to some embodiments, determining which pages have related content may include analyzing a user's browser history metadata to determine correlations between certain pages. Returning to the financial service provider example, the use's browser history metadata may reveal that the user regularly visits a webpage associated with financial service provider A (e.g., to check an account balance) before visiting the webpage of financial service provider B within a predetermined time period of visiting the webpage of financial service provider A. In some embodiments, the system may parse the content of each existing browser bookmark for contextual data to determine whether the contextual data indicates that a respective browser bookmark is related to the webpage currently being viewed by the user. In some embodiments, contextual data may be determined by parsing the content of the webpage to determine one or more subject headers associated with the webpage. A subject header may provide contextual data to the dynamic browser bookmark system that allows the system to determine the subject of the webpage and whether the bookmarked webpage is sufficiently related to the webpage being viewed by the user to be included in the first plurality of browser bookmarks in step 130. According to some embodiments, contextual data may be determined based on any content found on the respective webpage. For example, after the system parses the content of the webpage, the full-text located on the website may be collected and fed through a machine learning model to generate a condensed summary associated with the webpage. The system may use the generated condensed summary as the contextual data for the respective webpage. To determine whether a separate webpage is related, the system may calculate a similarity score between each generated condensed summary. Further, in some embodiments, multiple parent page bookmarks and related children page bookmarks may be determined to be related to the webpage being viewed by the user. In response, the system may display these parent-children bookmarks in a hierarchical view, wherein the parent—child relationship between the browser bookmarks is conveniently displayed to the user (e.g., by providing a respective parent page bookmark as a main bookmark with related children page bookmarks shown as sub-bookmarks associated with the parent page bookmark). In some embodiments, the hierarchical view can include the option for the user to conveniently expand and collapse the hierarchical view such that only the parent pages may be displayed in the collapsed view, and both the parent and children bookmarks are displayed in the expanded view.

In step 140, the system may generate a first graphical interface. The first graphical interface may include the hierarchical view of related browser bookmarks as discussed with respect to step 130. In some embodiments, the hierarchical view (e.g., the parent—children relationship between the related browser bookmarks) may be determined in a similar manner as discussed with respect to step 120 (e.g., by parsing the URL to determine a root page and setting the root page as the parent page and setting pages sharing the same root page but having additional URL components as children pages and/or utilizing a directed graph to determine more complex parent-child relationships among pages not sharing the same root URL). In step 150, the system may transmit the first graphical user interface to the user device. For example, when the first webpage being viewed by the user is www.github.com, the user may be provided a hierarchical list of browser bookmarks related to www.github.com, such as those of particular github repositories that the user has already added to their browser bookmarks.

In step 160, the system may determine a second webpage being viewed by the user device. In some embodiments, the user may access the second webpage from a hyperlink or URL present on the first webpage. Continuing the previous example, the user may click on a hyperlink present on a child webpage of the parent webpage www.github.com which may cause the user computing device to access a second webpage. For example, a URL present on a respective github child page may take the user to a webpage for a separate coding repository. This may prompt the system to associate the second webpage with the first webpage such that at least one of the adaptive browser bookmarks associated with the first webpage becomes associated with the second webpage. According to some embodiments, each of the adaptive browser bookmarks associated with the first webpage will be associated with the second webpage. In some embodiments, only some of the adaptive browser bookmarks of the first webpage will become associated to the second webpage. In such embodiments, the system may determine which adaptive browser bookmarks to link to the second webpage by determining a similarity between a condensed summary of the second webpage and each of the adaptive browser bookmarks as described in more detail with respect to step 130 above.

In step 170, the system may dynamically filter the plurality of browser bookmarks to determine a second plurality of browser bookmarks. For example, the system may determine contextual information for the second webpage similarly as described with respect to the first webpage in step 130. In some embodiments, when the user accesses the second webpage from at least one hyperlink present on the first webpage, the system may determine that at least one browser bookmark already with the first webpage should also be associated with the second webpage. For example, when the first webpage is a child page of the parent page www.github.com and the second webpage is a separate coding repository to which a hyperlink was provided on the child webpage of www.github.com, the system may associate the first plurality of browser bookmarks with the second webpage and save the browser bookmarks as the second plurality of browser bookmarks. In other embodiments, the user may access the second webpage in a different manner than clicking on a URL or hyperlink present on the first webpage. In this case, the system may determine contextual information for both the first webpage and the second webpage as described in more detail in step 130, and compare the contextual information of the first and second webpage to determine whether any of the browser bookmarks associated with the first webpage should be dynamically linked to the second webpage for convenient display to the user when the user accesses the second webpage (e.g., as further described with respect to FIG. 2).

In step 180, the system may generate a second graphical user interface. Generating the second graphical user interface may be substantially similar to generating the first graphical user interface as described with respect to step 140, and may include a convenient hierarchical view of the second plurality of browser bookmarks, including the parent-child relationships among the second plurality of browser bookmarks. Generating the second graphical user interface may further include transmitting the second graphical user interface to the user device as described with respect to step 150.

Figure 2:
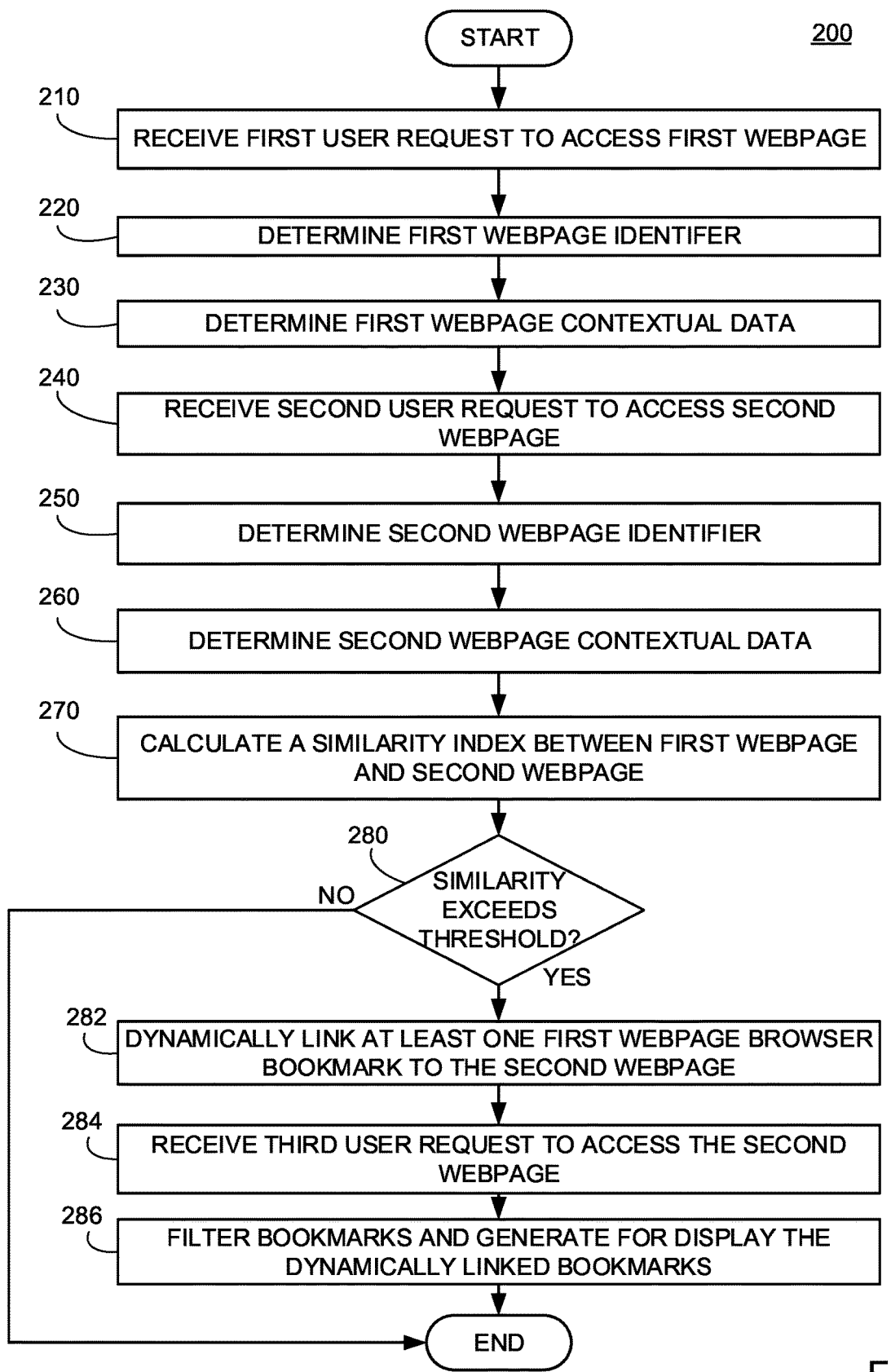
FIG. 2 is a flow chart of a method of dynamic filtering and contextual presentation of browser bookmarks, in accordance with some examples of the present disclosure.

FIG. 2 is a flow chart of a method of dynamically filtering browser bookmarks for hierarchical presentation based on contextual data. Although steps in method 200 are described as being performed by the system (e.g., system 400 as described in more detail with respect to FIGS. 4-5) a person of ordinary skill in the art would understand that some or all of the steps of method 200 may be performed by one or more devices of the system (e.g., user computing device 420 and/or bookmark evaluation device 410, as described in more detail with respect to FIGS. 4-5). As shown in FIG. 2, in step 210 of method 200, the system (e.g., system 400) may receive a first user request to access a first webpage. For example, the system may detect that a user entered a hyperlink or URL into the browser of user computing device 420. In step 220, the system may determine at least one first webpage identifier based on the first user request. For example, the system may parse the hyperlink entered into the browser of user computing device 420 to determine the parent page of the webpage being viewed by user computing device. In some embodiments, the system may identify the first webpage identifier as the URL or hyperlink used to access the first webpage, or the system may parse the URL or hyperlink and only use a portion of the hyperlink as the webpage identifier (e.g., using the root portion of the URL or hyperlink as the first webpage identifier).

In step 230, the system may determine first webpage contextual data. In some embodiments, first webpage contextual data may be determined based in part on the respective URL or hyperlink for accessing the first webpage. In some embodiments, the system may parse the content of the first webpage for contextual data. Contextual data may be determined by parsing the content of the webpage to determine one or more subject headers associated with the webpage. A subject header may provide contextual data to the dynamic browser bookmark system that allows the system to determine the subject of the webpage and whether a bookmarked webpage is sufficiently related to the webpage being viewed by the user to be displayed to the user on user computing device 420 when the user accesses the first webpage. In some embodiments, contextual data may be determined based on any content found on the respective webpage. For example, after the system parses the content of the webpage, the full-text located on the website may be collected and fed through a machine learning model to generate a condensed summary associated with the webpage. This condensed summary may be vectorized by the machine learning model, and the vectorized summary may be compared to vectorized summaries for other webpages to determine whether a bookmarked webpage is sufficiently related to the webpage being viewed by the user. According to some embodiments, the similarity between the vectorized condensed summaries may be calculated according to a Cosine similarity or a Jaccard similarity.

In step 240, the system may receive a second user request to access a second webpage. In some embodiments, the second webpage may be accessed by the user via at least one URL or hyperlink associated with the first webpage. In other embodiments, the user may independently access the second webpage by entering the URL or hyperlink for the second webpage manually.

In step 250, the system may determine a second webpage identifier. Determining the second webpage identifier may be determined in a substantially similar manner as described with respect to step 220. In step 260 the system may determine second webpage contextual data. Second webpage contextual data may be determined in a similar manner as described with respect to step 230.

In step 270, the system may calculate a similarity index between the first webpage contextual data and the second webpage contextual data. For example, both first webpage and second webpage contextual data may be stored by the system as a vector value indicative of the context of the respective webpage. The contextual data may be a vector representation of a main subject of the respective webpage. The vector representation of the contextual data may be based on a trained machine learning model that receives the contextual data parsed from the respective webpage and transforms the context into a vector. Once the first webpage and second webpage contextual data is in a vector representation, the similarity index may be calculated by determining a Cosine similarity between the first webpage contextual vector and second webpage contextual vector. According to some embodiments, a Jaccard similarity may be calculated in lieu of a Cosine similarity to determine the similarity index between the first webpage and second webpage contextual data.

In decision block 280, the system may determine whether the similarity index exceeds a predetermined threshold. When the system determines that the similarity index does not exceed the predetermined threshold, method 200 may end. When the system determines that the similarity index exceeds the predetermined threshold, the method may move to step 282.

In step 282, the system may dynamically link at least one first webpage browser bookmark to the second webpage. In step 284, the system may receive a third user request to access the second webpage. In this case, the system may have already determined that at least one first webpage browser bookmark should be linked to the second webpage. Accordingly, in step 286, the system may dynamically filter the user's existing bookmarks and generate for display the bookmarks dynamically linked from the first webpage to the second webpage. In some embodiments, more than one browser bookmark may be dynamically linked to the second webpage from the first webpage. For example, when the first webpage includes a parent bookmark and multiple children bookmarks, the system may associate the parent bookmark and multiple children bookmarks to the second webpage and display the bookmarks in a hierarchical view to conveniently display the parent-children relationship between the bookmarks being displayed. In some embodiments, all of the browser bookmarks associated with the first webpage may be associated with the second webpage based on the similarity index score. For example, when the similarity index in step 280 exceeds a first predetermined threshold, at least one browser bookmark may be dynamically linked to the second webpage and when the similarity index in step 280 exceeds a second predetermined threshold, all the browser bookmarks of the first webpage may be dynamically linked to the second webpage. Finally, the system may display the dynamically linked bookmarks to the user on the user computing device.

Figure 3:
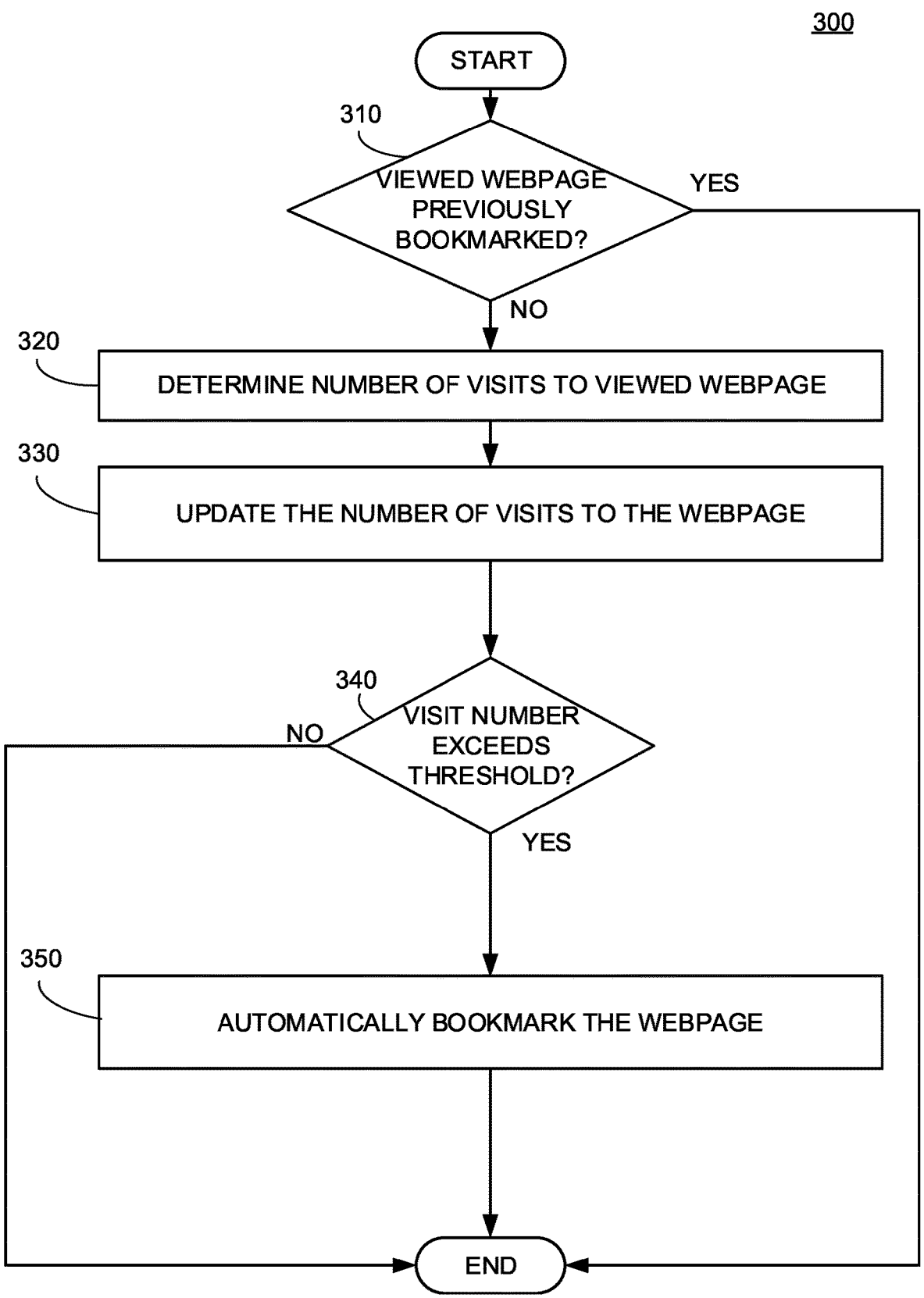
FIG. 3 is a flow chart of a method of automatically adding a browser bookmark to the dynamic browser bookmarking system, in accordance with some examples in the present disclosure.

FIG. 3 is a flow chart of a method of automatically bookmarking webpages based on a number of visits to a respective webpage. Although steps in method 300 are described as being performed by the system (e.g., system 400 as described in more detail with respect to FIGS. 4-5) a person of ordinary skill in the art would understand that some or all of the steps of method 300 may be performed by one or more devices of the system (e.g., user computing device 420 and/or bookmark evaluation device 410, as described in more detail with respect to FIGS. 4-5). As shown in FIG. 3, in decision block 310 of method 300, the system (e.g., system 400) may determine whether a webpage currently being viewed by the user (e.g., using user computing device 420) has been previously bookmarked. When the system determines that the webpage currently being viewed by the webpage has been previously bookmarked, method 300 may end. When the system determines that the currently viewed webpage has not been previously bookmarked, method 300 may move to step 320.

In step 320, the system may determine a number of visits to the currently viewed webpage. For example, the system may keep a numerical count of the number of times a user has visited a respective webpage. The system may determine the number of visits based in part on previously generated browser history associated with a user account registered with the user's browser. In step 330, the system may update the number of visits to the currently viewed webpage. For example, if the system determines that the currently viewed webpage has been visited "N" times, the system may increment the count by 1 and update the visit count to be "N+1."

In decision block 340, the system may determine whether the visit count exceeds a predetermined threshold. When the system determines that the visit count does not exceed the predetermined threshold, method 300 may end. When the system determines that the visit count exceeds the predetermined threshold, method 300 may move to step 350. In step 350, in response to the visit count exceeding the predetermined threshold, the system may automatically bookmark the webpage visited by the user. According to some embodiments, the threshold may not be predetermined, but rather be dynamically determined. The dynamically determined threshold may be calculated based on a relative visit count of all pages recorded by the system. For example, as the visit count for a first plurality of bookmarked page increases, the system may adjust the dynamic threshold for a new page to become bookmarked upwards. Conversely, when visit counts and/or frequency for other bookmarked pages decreases, the system may dynamically adjust the threshold downwards.

In some embodiments, the system may be further configured to monitor the number of future visits over time. When the respective webpage is not visited for a set time period, the system may decay the visit count for the respective webpage. For example, when a webpage has not been visited by the user for 4 weeks, a webpage visit count may be reduced by 10%. In some embodiments, the dynamic browser bookmark system may be configured to run a check to remove certain webpages from the automatically added browser bookmarks. For example, when the system determines that an added bookmark is associated with a search engine result (e.g., by parsing a hyperlink or URL associated with the browser bookmark and checking the root of the URL or hyperlink against a known list of search engine domain names), the system may automatically remove such browser bookmarks from the adaptive browser bookmarking system.

Figure 4:
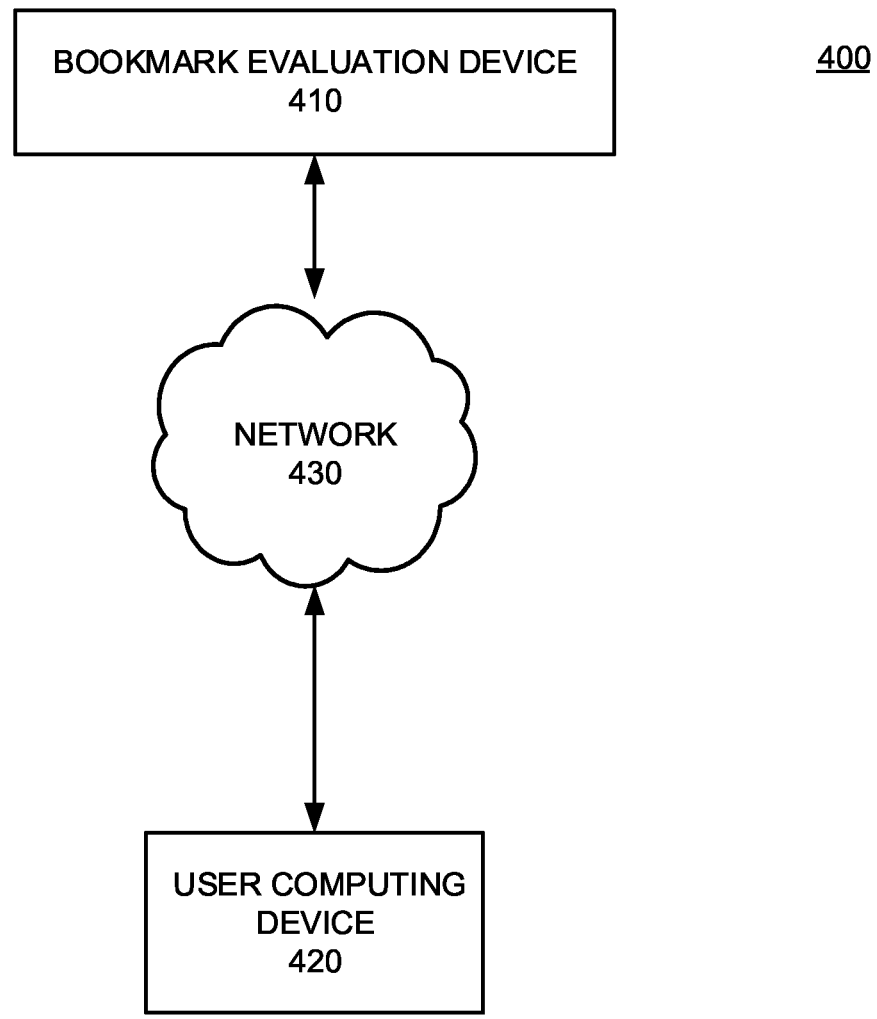
FIG. 4 illustrates an exemplary dynamic browser bookmark system consistent with the disclosed embodiments.

FIG. 4 depicts an example dynamic browser bookmark system according to an example implementation of the disclosed technology. The example system 400 may include a plurality of devices connected by network 430. The system 400 may include one or more user computing devices. The user computing device may be associated with a browser account, which may store browser metadata, such as search history, browser bookmarks, browser cookies, and the like. User computing devices 420 may include one or more of one or more of a mobile device, smart phone, general purpose computer, tablet computer, laptop computer, telephone, PSTN landline, smart wearable device, voice command device, other mobile computing device, or any other device capable of communicating with the network 430 and ultimately communicating with one or more components of the system 400. In some embodiments, user computing devices 420 may include or incorporate electronic communication devices for hearing or vision impaired users. According to some embodiments, user computing devices 420 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Further, the system 400 may be in communication (e.g., via network 430) with a bookmark evaluation device 410. As described in more detail with respect to FIG. 5, the bookmark evaluation device is configured to establish communication with the user computing device(s) 420 of the dynamic browser bookmark system 400. Bookmark evaluation device may be configured with a natural language processing (NLP) program configured to parse the browser webpages visited by the user computing device to determine webpage contextual information (e.g., using a trained classifier, or a combination of a pretrained model with the trained classifier).

In some embodiments, the bookmark evaluation device 410 may be used to implement an automated natural language processing program that may vectorize the determined contextual information of a first webpage and a second webpage and determine a similarity between the contextual information of the first webpage and the second webpage based on calculating the similarity between the vectorized contextual information. In some embodiments, the similarity measurement may be based upon a Cosine similarity, but other methods of determining similarity are not precluded. In some embodiments, the contextual information may be based upon parsing the content of the webpage, determining at least one subject header, and determining the contextual information of the webpage based on the at least one subject header. Additionally, the bookmark evaluation system may be programmed with a rule-based platform that may be used to determine the contextual information of a respective webpage. The contextual information may be based on an input received from a user computing device (e.g., user computing device 420), such as when a user of the user computing device clicks on a hyperlink or URL present on a webpage.

Bookmark evaluation device 410, may include one or more computer systems configured to compile data from every web page on which the system is employed. Bookmark evaluation device 410 may correlate compiled data, analyzed the compiled data, arrange the compiled data, generate derived data based on the compiled data, and store the compiled and derived data in a database (e.g., database 560). The database may be used by bookmark evaluation device to store contextual data that may be used to determine whether a webpage bookmark is sufficiently related to a webpage being viewed by the user computing device 420. Database 560 may also be configured to store the vectorized contextual data associated with the webpages visited by the user device 420. Bookmark evaluation device 410 may also include one or more application program interfaces (APIs) that provide various functionalities related to the operations of the system 400. In some embodiments, bookmark evaluation device 410 may include API adapters that enable the privacy system 410 to interface with and utilize enterprise APIs maintained by organizations and associated entities that are associated with the one or more programs running on the user computing device 420. In some embodiments, APIs can provide functions that include, for example, receiving webpage metadata, including cookies, browsing history, etc., from the user computing device 420 for any webpages being viewed by the user computing device 420 in substantially real time. In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, user computing device 420) to exchange data with a system that implements the API (such as, for example, the bookmark evaluation device 410), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

Figure 5:
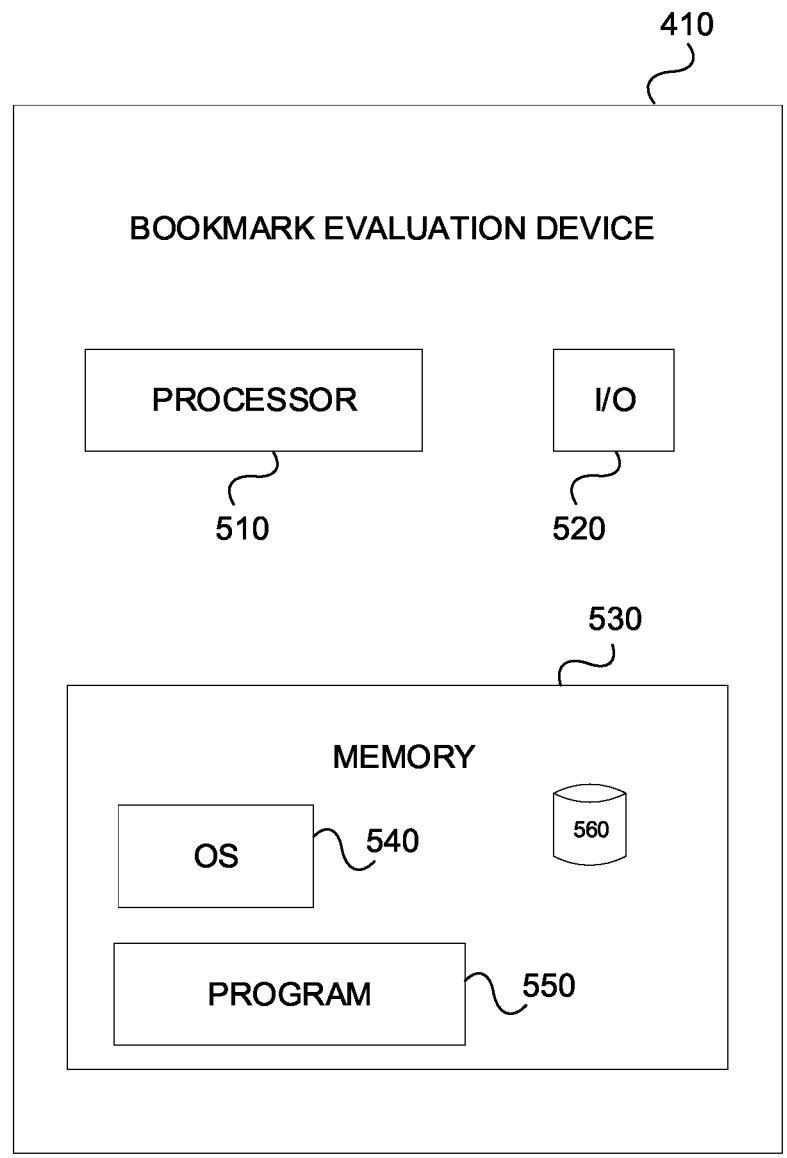
FIG. 5 is a component diagram of an exemplary bookmark evaluation device.

In accordance with certain example implementations of the disclosed technology, the bookmark evaluation device 710 may be configured to receive and parse content of webpages to determine contextual data of the webpage being viewed on user computing device 420 using NLP methods enabled by an NLP program (e.g. program 550, described in more detail with respect to FIG. 5).

Facilitating communication between components of system 400, the network 430 may be of any suitable type, including individual connections via the Internet such as cellular or WiFi networks. In some embodiments, the network 430 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

As shown in more detail in FIG. 5, bookmark evaluation device 410 may include a processor 510, an input/output ("I/O") device 520, a memory 530 containing an operating system ("OS") 540, one or more program(s) 550, and a database 560. For example, bookmark evaluation device 410 may be a single device or server or may be configured as a distributed computer system including multiple servers, devices, or computers that interoperate to perform one or more of the processes and functionalities associated with the disclosed embodiments. In some embodiments, bookmark evaluation device 410 may further include a peripheral interface, a transceiver, a mobile network interface in communication with the processor 510, a bus configured to facilitate communication between the various components of bookmark evaluation device 410, and a power source configured to power one or more components of bookmark evaluation device 410. Servers, databases, and other computing devices (e.g., the user computing device(s) 420) included in the system 400 may include many components that are similar to or even have the same capabilities as those described with respect to bookmark evaluation device 410. In some embodiments, bookmark evaluation device 410 may include an API running locally on user computing devices 420 that allow the bookmark evaluation device 410 to directly communicate and provide instructions to user computing device 420.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 510 to communicate with other devices via wired or wireless networks, whether local or wide area, private or public, as known in the art. A power source may be configured to provide an appropriate alternating current (AC) or direct current (DC) to power components.

The processor 510 may include one or more of a microprocessor, microcontroller, digital signal processor, co-processor or the like or combinations thereof capable of executing stored instructions and operating upon stored data. The memory 830 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 530.

The processor 510 may be one or more known processing devices, such as a microprocessor from the Pentium™ family manufactured by Intel™ or the Turion™ family manufactured by AMD™. The processor 510 may constitute a single core or multiple core processor that executes parallel processes simultaneously. For example, the processor 510 may be a single core processor that is configured with virtual processing technologies. In certain embodiments, the processor 510 may use logical processors to simultaneously execute and control multiple processes. The processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Bookmark evaluation device 410 may include one or more storage devices configured to store information used by the processor 510 (or other components) to perform certain functions related to the disclosed embodiments. In some embodiments, the bookmark evaluation device 410 may include a memory 530 that includes instructions to enable processor 510 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, bookmark evaluation device 410 may include memory 530 that includes instructions that, when executed by the processor 510, perform one or more processes consistent with the functionalities disclosed herein. Methods, systems, and articles of manufacture consistent with disclosed embodiments are not limited to separate programs or computers configured to perform dedicated tasks. For example, bookmark evaluation device 410 may include memory 530 that may include one or more programs 550 to perform one or more functions of the disclosed embodiments. Moreover, the processor 510 may execute one or more programs 550 located remotely from the bookmark evaluation device 410 (e.g., a program operating on a user computing device 420). For example, bookmark evaluation device 410 may access one or more remote programs 850, that, when executed, perform functions related to disclosed embodiments.

In certain example implementations, the program 550 that may include a rule-based platform 590 for determining webpage contextual data. In some embodiments, bookmark evaluation device 410 may include a trained machine learning model 595 for determining the webpage contextual data in accordance with a model that may be continuously or intermittently updated. Moreover, the processor 510 may execute one or more programs 550 located remotely from bookmark evaluation device 510 (such as user computing devices 420). For example, bookmark evaluation device 410 may access one or more remote programs 550 (such as the rule-based platform 590 or the trained machine learning model 595), that, when executed, perform functions related to disclosed embodiments. According to an example implementation of the disclosed technology, information received from the one or more applications running on the user computing device 420 via one or more APIs operating on privacy system may allow the system to determine whether a respective webpage being viewed by the user computing device 420 has includes webpage contextual data within a predetermined threshold of similarity to one or more webpage bookmarks stored on the bookmark evaluation device 410. The webpage contextual data may be vectorized and compared to the contextual data saved for each of the bookmarks stored by the bookmark evaluation device 410 (e.g., in database 560). In some use cases bookmark evaluation device 410 may make the determination using the trained machine learning model 595, the rules based platform 590, or a combination of both as a way of enhancing the performance of the rules based platform 590, for example, by determining which rules have priority over other rules and what rules should be applied in a given context.

According to some embodiments, a bookmark evaluation device 410 may utilize deep learning models such as a convolutional neural network (CNN) that transforms a word into a word vector and long short-term memory (LSTM) that transforms a sequence of word vectors into a webpage contextual vector to determine the subject matter addressed by a respective webpage. According to some embodiments, the bookmark evaluation device 410 may utilize NLP program 598 in order to translate written content of a webpage into webpage contextual data that may be vectorized to perform similarity calculations to the vectorized contextual data of stored webpage bookmarks. According to some embodiments, other document embedding machine learning models may be utilized, such as a bidirectional encoder from transformers (BERT) model, a universal sentence encoder model (USE), Doc2vec, TF-IDF, and/or the Jaccard algorithm.

According to some embodiments, the trained machine learning model 595 may be trained by updating a database (e.g. database 560) with the results of contextual data from previous bookmarking sessions in which the bookmark evaluation device 410 has been implemented. The data in the database 560 may be utilized to allow system 400 to undergo supervised training in a neural network model. According to some embodiments, the machine learning module 595 may extract heuristics and/or additional case-based logic to be added to, for example, the rule-based platform 590. Thus, system 400 is capable of expanding its case-based reasoning supplied by rule-based platform 590 by utilizing machine learning techniques enabled by machine learning module 595 and/or NLP program 598.

According to some embodiments, system 400 may be configured to dynamically adapt to a user's preferences. For example, when system 400 determines that a browser bookmark has contextual data exceeding a predetermined threshold of similarity to a webpage being viewed by the user computing device 420, the system may generate a graphical user interface including the bookmark and requesting confirmation that the bookmark is relevant to the webpage being currently viewed. A confirmation received from the user (e.g., via an input to the user computing device 420) may be used as training data to update the machine learning predictions generated by the machine learning module 595. According to some embodiments, the machine learning module 595 may be retrained after a predetermined number of observations (e.g. a predetermined number of identifications of relevant browser bookmarks). When no browser bookmarks are determined relevant, the system prompt the user to verify whether a preexisting browser bookmark should be linked to the webpage being viewed, which may also iteratively increase the predictive accuracy of the model (e.g., by expanding the case-based reasoning supplied by rule-based platform 590 and/or refining the machine learning model employed by machine learning module 595 and/or NLP program 598).

Contextual webpage data classification may include mapping text, audio, video, or other media into contextual data, which represent what a webpage is describing. Named entity recognition may involve identifying named entities such as persons, places, organizations, account types, and product types in text, audio, video, or other media.

The memory 530 may include one or more memory devices that store data and instructions used to perform one or more features of the disclosed embodiments. The Memory 530 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. The memory 830 may also include software, such as Hadoop™, enabling the system to store and process large volumes of data distributed across a cluster of commodity servers and commodity storage connected via the network 430. The memory 530 databases may consist of files on the system 400 that are simply read into the memory, and the disclosed embodiments are not limited to separate databases or even to the use of a database. The memory 530 may include software components that, when executed by the processor 510, perform one or more processes consistent with the disclosed embodiments. In some embodiments, the memory 530 may include a database 560 for storing related data to enable the system 400 to perform one or more of the processes and functionalities associated with the disclosed embodiments.

Bookmark evaluation device 410 may also be communicatively connected to one or more memory devices (e.g., databases) locally or through the network 430. The remote memory devices may be configured to store information and may be accessed and/or managed by bookmark evaluation device 410. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 430. These memory devices may consist of files on the system 400 that are simply read into the memory, and the disclosed embodiments are not limited to separate databases or even to the use of a database. Systems and methods consistent with disclosed embodiments, however, are not limited to separate databases or even to the use of a database.

Bookmark evaluation device 410 may also include one or more I/O devices 520 that may comprise one or more interfaces for receiving signals or input from devices and providing signals or output to one or more devices that allow data to be received and/or transmitted by bookmark evaluation device 410. For example, bookmark evaluation device 410 may include interface components, which may provide interfaces to one or more input devices, such as one or more keyboards, mouse devices, touch screens, track pads, trackballs, scroll wheels, digital cameras, microphones, sensors, scanners, and the like, that enable bookmark evaluation device 410 to receive data from one or more users.

In exemplary embodiments of the disclosed technology, bookmark evaluation device 410 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While bookmark evaluation device 410 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of bookmark evaluation device 410 may include a greater or lesser number of components than those illustrated.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions.

Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

The following exemplary use cases describe examples of a typical user flow pattern. They are intended solely for explanatory purposes and not in limitation. In one example, a user may be browsing the internet on a user computing device. The user may have an account on a browser operating on the user computing device that stores metadata related to the user's browsing history. For example, the user's browser account may store metadata such as cookies, browsing history, downloaded files, and the like. The bookmark evaluation device may aggregate existing browser bookmarks from the user computing device. In some cases, the bookmark evaluation device may determine that certain bookmarks have related contextual data by analyzing the metadata stored by the user's browser account. In such cases, whenever the user accesses a webpage the bookmark evaluation device may provide the relevant browser bookmarks to the user in a graphical user interface to allow the user to quickly and easily see the browser bookmarks relevant to the webpage being viewed. When a user clicks on a hyperlink for a second webpage present on the webpage currently being viewed on the user computing device, the system may determine that one or more of the relevant bookmarks associated with the first webpage should be dynamically linked to the second webpage. When the user accesses a second webpage without clicking on a hyperlink located on the first webpage, the bookmark evaluation system may parse the content of both the first webpage and the second webpage and use a trained machine learning model to determine contextual data vector for both the first and second webpage. The system may calculate a similarity score between the first and second webpage (e.g., using a Cosine similarity between the contextual data vector for the first webpage and the contextual data vector for the second webpage), and when the score exceeds a predetermined threshold, the system may associate the first webpage browser bookmarks to the second webpage. Accordingly, when the user visits the second webpage, the first webpage browser bookmarks will be dynamically linked to the second webpage and presented in a hierarchical view (e.g., clearly showing parent-page and child-page relationships among the browser bookmarks).

Examples of the present disclosure relate to systems and methods for providing automatic and adaptive browser bookmarks. In one aspect, a dynamic browser bookmark system for hierarchical presentation of a user's bookmarks based on contextual data is disclosed. The system may implement a method according to the disclosed embodiments. The system may include one or more processors, and a memory in communication with the one or more processors and storing instructions, that when executed by the one or more processors are configured to cause the system to perform steps of a method according to the disclosed embodiments. For example, the system may aggregate, from a user device, a plurality of browser bookmarks associated with a user of the user device. Each browser bookmark may include a hyperlink configured to provide access to a respective browser bookmark. The system may determine a first webpage being viewed by the user device. The system may dynamically filter the plurality of browser bookmarks to determine a first plurality of browser bookmarks associated with the first webpage. The system may generate a first graphical user interface including a hierarchical view of the first plurality of browser bookmarks. The hierarchical view may be based in part on the included hyperlinks of the first plurality of browser bookmarks. The system may transmit the first graphical user interface to the user device. The system may determine a second webpage being viewed by the user device. The second webpage may be accessed by the user device through at least one hyperlink present on the first webpage. The system may dynamically filter the plurality of browser bookmarks to determine a second plurality of browser bookmarks associated with the second webpage. The second plurality of browser bookmarks may include at least one browser bookmark of the first plurality of browser bookmarks. The system may generate second graphical user interface including a hierarchical view of the second plurality of browser bookmarks.

In some embodiments, determining that each of the plurality of browser bookmarks associated with the user further comprises determining whether a webpage being viewed by the user device has been previously bookmarked. In response to determining that the webpage has not been bookmarked, the system may determine a number of visits to the webpage. The system may update the number of visits to the webpage. The system may determine whether the updated number of visits to the webpage exceeds a predetermined threshold. In response to the number of visits exceeding the predetermined threshold, the system may automatically bookmark the webpage.

In some embodiments, the number of visits to the webpage is decreased proportionally to an amount of time that the webpage has not been accessed by the user device.

In some embodiments, a hierarchical view of the first plurality of browser bookmarks may further include a parent page and one or more related children pages.

In some embodiments, a webpage context may be determined for each browser bookmark by parsing each word contained on a respective webpage, determining one or more subject headers located on the respective webpage, and selecting at least one of the one or more subject headers as the webpage context for the respective webpage.

In some embodiments, the system may further determine whether the bookmarked webpage corresponds to a search results webpage. In response to the determination, the system may remove the bookmarked webpage from the plurality of browser bookmarks.

In some embodiments, determining the number of visits to the webpage may further include determining whether the bookmarked webpage corresponds to a child webpage of a parent webpage and when the bookmarked webpage corresponds to a child webpage of the parent webpage, the system may update the number of visits to the parent webpage.

In another aspect, a system for dynamic filtering and contextual presentation of browser bookmarks is disclosed. The system may receive, from a user device, a first user request to access a first webpage. The system may determine, based on the first user request, at least one first webpage identifier. The system may determine first webpage contextual data based on the first webpage identifier. The system may receive, from the user device, a second user request to access a second webpage, wherein the second webpage is accessed through at least one hyperlink associated with the first webpage. The system may determine, based on the second user request, at least one second webpage identifier. The system may determine second webpage contextual data based on the second webpage identifier. The system may calculate a similarity index between the first webpage and the second webpage based on a comparison of the first webpage contextual data and the second webpage contextual data. When the similarity index exceeds a predetermined threshold, the system may dynamically link at least one browser bookmark of the first plurality of browser bookmarks to the second webpage. The system may receive, from the user device, a third user request to access the second webpage, and dynamically filter the plurality of browser bookmarks to generate for display, on the user device, the first plurality of browser bookmarks that are dynamically linked to the second webpage.

In some embodiments, a webpage identifier further includes a hyperlink providing access to a respective webpage.

In some embodiments, the webpage contextual data may be determined by parsing each word contained on a respective webpage, determining one or more subject headers located on the respective webpage, and selecting at least one of the one or more subject headers as the webpage contextual data for the respective webpage.

In some embodiments, determining each of the plurality of browser bookmarks associated with the user may further include determining whether a webpage being viewed by the user device has been previously bookmarked. In response to determining that the webpage has not been bookmarked, the system may determine a number of visits to the webpage. The system may update the number of visits to the webpage and determine whether the updated number of visits exceeds a predetermined threshold. In response to the number of visits exceeding the predetermined threshold, the system may automatically bookmark the webpage.

In some embodiments, the system may decrease the number of visits to the webpage proportionally to an amount of time that the webpage has not been accessed by the user device.

In some embodiments, determining the number of visits to the webpage may further include determining whether the bookmarked webpage corresponds to a child webpage of a parent webpage. When the bookmarked webpage corresponds to the child webpage of the parent webpage, the system may update the number of visits to the parent webpage.

In another aspect, a method for dynamic filtering and contextual presentation of browser bookmarks is disclosed. The method may include aggregating, from a user device, a plurality of browser bookmarks associated with the user of the user device. Each browser bookmark may include a hyperlink configured to provide access to a respective browser bookmark. The method may include determining a first webpage being viewed by the user device. The method may include dynamically filtering the plurality of browser bookmarks to determine a first plurality of browser bookmarks associated with the first webpage. The method may include generating a first graphical user interface including hierarchical view of the first plurality of browser bookmarks. The method may include transmitting the first graphical user interface to the user device. The method may include determining a second webpage being viewed by the user device, and dynamically filtering the plurality of browser bookmarks to determine a second plurality of browser bookmarks associated with the second webpage. The second plurality of browser bookmarks may include at least one browser bookmark o the first plurality of browser bookmarks. The method may include generating a second graphical user interface that includes a hierarchical view of the second plurality of browser bookmarks.

In some embodiments, determining each of the plurality of browser bookmarks associated with the user may further include determining whether a webpage being viewed by the user device has been previously bookmarked. In response to determining that the webpage has not been bookmarked, the method may include determining a number of visits to the webpage. The method may include updating the number of visits to the webpage, and determining whether the updated number of visits to the webpage exceeds a predetermined threshold. The method may include automatically bookmarking the webpage in response to the number of visits exceeding the predetermined threshold.

In some embodiments, the method may include decreasing a number of visits to the webpage proportionally to an amount of time that the webpage has not been accessed by the user device.

In some embodiments, the hierarchical view of the first plurality of browser bookmarks may further include a parent page and one or more related children pages.

In some embodiments, the method may include determining a webpage context by parsing each word contained on a respective webpage and determining one or more subject headers located on the respective webpage. The method may further include selecting at least one of the one or more subject headers as the webpage context for the respective webpage.

In some embodiments, the method may further include, determining whether the bookmarked webpage corresponds to a search result webpage. In response to the determination, the method may include removing the bookmarked webpage from the plurality of browser bookmarks.

In some embodiments, determining the number of visits to the webpage may further include determining whether the bookmarked webpage corresponds to a child webpage of a parent webpage. When the bookmarked webpage corresponds to the child webpage of the parent webpage, the method may include updating the number of visits to the parent webpage.

What is claimed is:

1. A dynamic browser bookmark system for hierarchical presentation of a user's bookmarks based on contextual data, the system comprising:
   one or more processors; and
   a memory in communication with the one or more processors and storing instructions that, when executed by the one or more processors, are configured to cause the system to:
   parse a plurality of historical bookmarked webpages for historical bookmarked contextual data by generating, using a trained machine learning model, a plurality of vectors comprising a plurality of vectorized summaries of each of the plurality of historical bookmarked webpages;
   determine a first webpage being viewed by a user of a user device;
   identify a first hyperlink associated with providing access to the first webpage;
   determine first webpage contextual data by generating, using the trained machine learning model, a first vector comprising a first vectorized summary of the first webpage;
   calculate a similarity index between the first vectorized summary and each of the plurality of vectorized summaries; and
   dynamically link at least one first browser bookmark of the plurality of historical bookmarked webpages to the first webpage when the similarity index exceeds a predetermined threshold thereby generating a plurality of browser bookmarks.

2. The system of claim 1, wherein determining each of the first plurality of browser bookmarks and the plurality of browser bookmarks associated with the user further comprises:
determining whether a webpage being viewed by the user device has been previously bookmarked;
determining a number of visits to the webpage responsive to determining that the webpage has not been bookmarked;
updating the number of visits to the webpage;
determining whether the updated number of visits to the webpage exceeds a predetermined threshold; and
automatically bookmarking the webpage in response to the number of visits exceeding the predetermined threshold.

3. The system of claim 2, wherein the number of visits to the webpage is decreased proportionally to an amount of time that the webpage has not been accessed by the user device.

4. The system of claim 2, further comprising:
determining whether the bookmarked webpage corresponds to a search result webpage; and
responsive to the determination, removing the bookmarked webpage from the plurality of browser bookmarks.

5. The system of claim 2, wherein determining the number of visits to the webpage further comprises:
determining whether the bookmarked webpage corresponds to a child webpage of a parent webpage; and
when the bookmarked webpage corresponds to the child webpage of the parent webpage, updating the number of visits to the parent webpage.

6. The system of claim 1, wherein the memory includes further instructions, that when executed by the one or more processors are configured to cause the system to generate a graphical user interface including a hierarchical view of the plurality of browser bookmarks.

7. The system of claim 6, wherein a hierarchical view of the first plurality of browser bookmarks further comprises a parent page and one or more related children pages.

8. The system of claim 1, wherein the trained machine learning model comprises a bidirectional encoder from transformers (BERT) machine learning model.

9. The system of claim 1, wherein the trained machine learning model comprises a Doc2vec machine learning model.

10. A system for dynamic filtering and contextual presentation of browser bookmarks, the system comprising:
one or more processors; and
a memory storing a plurality of browser bookmarks comprising a first plurality of browser bookmarks associated with a first webpage, the memory in communication with the one or more processors and storing instructions that, when executed by the one or more processors, are configured to cause the system to:
receive, from a user device, a first user request to access the first webpage;
determine, based on the first user request, at least one first webpage identifier;
determine first webpage contextual data based on the first webpage identifier;
receive, from the user device, a second user request to access a second webpage;
determine, based on the second user request, at least one second webpage identifier;
determine second webpage contextual data based on the second webpage identifier;
calculate a similarity index between the first webpage and the second webpage based on a comparison of the first webpage contextual data and second webpage contextual data; and
when the similarity index exceeds a predetermined threshold, dynamically link at least one browser bookmark of the first plurality of browser bookmarks to the second webpage.

11. The system of claim 10, wherein determining each of the plurality of browser bookmarks associated with a user of the user device further comprises:
determining whether a webpage being viewed by the user device has been previously bookmarked;
determining a number of visits to the webpage responsive to determining that the webpage has not been bookmarked;
updating the number of visits to the webpage;
determining whether the updated number of visits to the webpage exceeds a predetermined threshold; and
automatically bookmarking the webpage in response to the number of visits exceeding the predetermined threshold.

12. The system of claim 11, wherein the number of visits to the webpage is decreased proportionally to an amount of time that the webpage has not been accessed by the user device.

13. The system of claim 12, wherein determining the number of visits to the webpage further comprises:
determining whether the bookmarked webpage corresponds to a child webpage of a parent webpage;
when the bookmarked webpage corresponds to the child webpage of the parent webpage, updating the number of visits to the parent webpage.

14. A method for dynamic filtering and contextual presentation of browser bookmarks, the method comprising:
parsing a plurality of historical bookmarked webpages for historical bookmarked contextual data by generating, using a trained machine learning model, a plurality of vectors comprising a plurality of vectorized summaries of each of the plurality of historical bookmarked webpages;
determining a first webpage being viewed by a user of a user device;
identifying a first hyperlink associated with providing access to the first webpage;
determining first webpage contextual data by generating, using the trained machine learning model, a first vector comprising a first vectorized summary of the first webpage;
calculating a similarity index between the first vectorized summary and each of the plurality of vectorized summaries; and
dynamically linking at least one first browser bookmark of the plurality of historical bookmarked webpages to the first webpage when the similarity index exceeds a predetermined threshold thereby generating a plurality of browser bookmarks.

15. The method of claim 14, wherein determining each of the plurality of browser bookmarks associated with the user further comprises:
determining whether a webpage being viewed by the user device has been previously bookmarked;
determining a number of visits to the webpage responsive to determining that the webpage has not been bookmarked;

updating the number of visits to the webpage;
determining whether the updated number of visits to the webpage exceeds a predetermined threshold; and
automatically bookmarking the webpage in response to the number of visits exceeding the predetermined threshold.

16. The method of claim 15, wherein the number of visits to the webpage is decreased proportionally to an amount of time that the webpage has not been accessed by the user device.

17. The method of claim 15, further comprising:
determining whether the bookmarked webpage corresponds to a search result webpage;
responsive to the determination, removing the bookmarked webpage from the plurality of browser bookmarks.

18. The method of claim 15, wherein determining the number of visits to the webpage further comprises:
determining whether the bookmarked webpage corresponds to a child webpage of a parent webpage;
when the bookmarked webpage corresponds to the child webpage of the parent webpage, updating the number of visits to the parent webpage.

19. The method of claim 14, further comprising generating a graphical user interface comprising a hierarchical view of the plurality of browser bookmarks, wherein the hierarchical view further comprises a parent page and one or more related children pages.

20. The method of claim 14, wherein the trained machine learning model comprises a model selected from (i) a bidirectional encoder from transformers (BERT) machine learning model, (ii) a Doc2vec machine learning model, or combinations thereof.

* * * * *